Patented Apr. 27, 1954

2,676,997

UNITED STATES PATENT OFFICE 2,676,997

DEHYDROCHLORINATION OF CHLOROETHANES

John H. Brown, Jr., Freeport, and Winston E. Larson, Lake Jackson, Tex., assignors to The Dow Chemical Company, Midland, Mich., a corporation of Delaware No Drawing. Application September 15, 1948, Serial No. 49,457

3 Claims. (Cl. 260—654)

This invention relates to a catalytic process for making chloroethylenes by the vapor-phase dehydrochlorination of certain chloroethanes.

It is known that chloroethylenes, especially vinyl chloride and vinylidene chloride, can be made by the vapor-phase pyrolytic dehydrochlorination of polychloroethanes. However, reaction rates are slow, even at quite high temperatures, so that the process, to be commercially useful, requires a catalyst of high activity. In the case of those polychloroethanes in which both carbon atoms are chlorine-substituted, e. g. ethylene chloride and 1.1.2-trichloroethane, chlorine effectively catalyzes the pyrolysis (U. S. Patent 2,378,859), and is used for the purpose. In contrast, with those polychloroethanes in which only one carbon atom is chlorine-substituted, i. e. with ethylidene chloride and methyl chloroform, which may be termed monomethylpolychloromethanes, chlorine exhibits no catalytic effect (Nature 157, 626–7 (1946)), and no other substance has been known to catalyze the reaction. As a result, the monomethylpolychloromethanes, though available cheaply as industrial by-products, have been little used as raw materials for making vinyl and vinylidene chlorides.

It has now been found, however, that ferric chloride actively catalyzes the vapor-phase thermal dehydrochlorination of ethylidene chloride and methyl chloroform.

In accordance with this finding, which forms the basis of the present invention, a chloroethylene, i. e. vinyl or vinylidene chloride, may be readily prepared by heating a vaporized monomethylpolychloromethane at a temperature of at least 100° C. in the presence of at least a catalytic proportion of ferric chloride for a time sufficient to effect dehydrochlorination.

In practice, the process is most readily carried out by vaporizing the ethylidene chloride or methyl chloroform and passing the vapor as a stream through a heated zone, usually a tube reactor, in intimate contact with the ferric chloride catalyst. The dehydrochlorination proceeds rapidly, so that the gas stream leaving the heated zone may be passed directly to a condenser to liquefy the chloroethylene product and any unreacted feed stock, allowing the hydrogen chloride formed in the pyrolysis to escape to a recovery system. The condensate may then be rectified to separate the desired chloroethylene product in purified form.

In general, adequate reaction rates are realized at temperatures above 100° C., the rate increasing with temperature, at least up to 600° C. Above this latter, undesired reactions become pronounced. Temperatures above 150° and below 500° C. are usually employed, with 200° to 400° C. being preferred in most cases. Dehydrochlorination is quite rapid, contact times in the heated zone of 0.2 to 20 seconds being usually sufficient, though longer times may be tolerated without much disadvantage. At 200° to 400° C., a contact time of 5 to 10 seconds is a good design value.

The catalytic effect on which the invention is based may be obtained simply by passing the vaporized chlorohydrocarbon feedstock over solid ferric chloride at a reaction temperature. However, since the catalyst is volatile, it is highly preferable to introduce it as a vapor into the stream of feed before or while the latter is in the heated zone. Only a small proportion of catalyst is required, 0.1 to 1.0 mol per cent of the monomethylpolychloromethane vapor being usually sufficient, though much larger proportions are permissible.

An alternative procedure, which is in general preferred, involves forming and maintaining the catalyst within the pyrolysis zone by the action of chlorine on metallic iron. According to this method, the stream of monomethylpolychloromethane vapor is mixed with a small proportion of chlorine, e. g. 0.1 to 5 mol per cent, and the mixture passed over metallic iron in a heated zone at a temperature and for a time within the ranges previously set forth. While the use of an iron reaction tube is moderately effective, the iron should preferably have extensive surface area. For this reason, it is desirably in the form of a mass of iron or stainless steel wire, steel wool, or reduced iron powder, the latter either as such or supported on pumice or alumina.

When operating with iron and chlorine as just described, the catalytic action seems to involve something more than the mere formation and immediate vaporization of ferric chloride in the dehydrochlorination zone. The catalytic effect is so great as to suggest that the ferric chloride, if it is formed, is in a particularly active state. Likewise, the iron remains largely unconsumed over long periods of time, and even retains much of its catalytic activity for some hours after chlorine flow is stopped. Quite probably there is a surface catalytic effect over and above the catalysis caused by ferric chloride vapor alone.

The following examples will further illustrate the invention but are not to be construed as limiting its scope.

*Example 1*

Methyl chloroform (1.1.1-trichloroethane) was dehydrochlorinated in a tubular glass reactor of 34 mm. inside diameter and 230 mm. length, packed with 25 grams of No. 2 steel wool. The methyl chloroform was vaporized and passed through the reactor at a rate of 1.68 gram mols per hour, being mixed at its point of entry into the reactor with gaseous chlorine fed at the rate of 6.5 cc. per minute (0° C., 1.0 atmosphere), corresponding to about 1.0 mol per cent of the methyl chloroform. The average temperature of the reactor was 167° C., with the maximum being 196° C. Contact time was about 12 seconds. The organic portion of the product gas was condensed and rectified to separate its constituents. Under these conditions, 58.8 per cent of the methyl chloroform passing through the reactor was dehydrochlorinated, and of this 98.5 per cent was recovered as vinylidene chloride.

In a comparative run not in accordance with the invention, in which there was no steel wool in the reaction chamber and chlorine was not used, conditions being otherwise the same as above, less than one per cent of the methyl chloroform underwent reaction. Addition of 1.0 mol per cent of chlorine during this test did not increase the rate of reaction.

From the foregoing, the exceptional catalytic activity of the steel wool-chlorine combination is clearly evident.

Example 2

Ethylidene chloride (1.1-dichloroethane) was dehydrochlorinated in the apparatus used in Example 1 packed with steel wool according to the procedure there described. The ethylidene chloride vapor was passed through the reactor at rate of 1.81 gram mols per hour, being mixed as it entered with 7.0 cc. per minute of chlorine (0° C., 1.0 atmosphere), corresponding to about 1.0 mol per cent of the ethylidene chloride. The average temperature in the reactor was 269° C., the maximum being 288° C. Contact time was about 9 seconds. Under these conditions, 66.2 per cent of the ethylidene chloride was dehydrochlorinated, and of this 99.4 per cent was recovered as vinyl chloride.

In a comparative run not according to the invention, in which the steel wool was omitted from the reactor, conditions being otherwise the same, less than one per cent of the ethylidene chloride underwent conversion, both without and with 1.0 mol per cent of chlorine.

Example 3

The apparatus of Ex. 1 was used for the dehydrochlorination of ethylidene chloride over steel wool with 1.0 mol per cent of chlorine. Operation at 268° to 272° C. with a contact time of about 5 seconds was continued without interruption for a period of 250 hours. During the entire time the conversion of ethylidene chloride to vinyl chloride was in the range of 55 to 65 per cent per pass. The activity of the steel wool-chlorine catalyst was unimpaired at the end of the run.

Example 4

Ethylidene chloride was dehydrochlorinated in the apparatus used in Example 1 with no steel wool in the reaction chamber. The ethylidene chloride vapor was passed through the reactor at a rate of 1.75 gram mols per hour. As it entered the reactor it was mixed with a stream of 28 cc. per minute (0° C., 1.0 atmosphere) of nitrogen which had been passed through a bed of ferric chloride maintained at 286° C. The contact time was about 9 seconds, and the temperature was in the range of 232 to 312° C. (average, 274° C.). Under these conditions, 39 per cent of the ethylidene chloride was dehydrochlorinated.

Virtually the same results were obtained when the ferric chloride vapor, instead of being furnished by passing the nitrogen through heated ferric chloride, was prepared by first mixing the nitrogen with 6.5 cc. per minute of chlorine and then passing this mixture through a mass of steel wool at 365° C. before introducing it into the ethylidene chloride vapor.

What is claimed is:

1. A process for making a chloroethylene which comprises passing a stream of a mixture of a vaporized monomethylpolychloromethane and from 0.1 to 5 mol per cent thereof of chlorine over metallic iron in a heated zone maintained at a temperature of 150° to 500° C.

2. In a process for making vinyl chloride, the step which comprises passing a stream of a mixture of ethylidene chloride vapor and from 0.1 to 5 mol per cent thereof of chlorine over a mass of steel wire in a heated zone maintained at a temperature of 150° to 500° C. at a rate corresponding to a contact time of from 0.2 to 20 seconds.

3. In a process of making vinylidene chloride, the step which comprises passing a stream of a mixture of methyl chloroform vapor and from 0.1 to 5 mol per cent thereof of chlorine over a mass of steel wire in a heated zone maintained at a temperature of 150° to 500° C. at a rate corresponding to a contact time of 0.2 to 20 seconds.

References Cited in the file of this patent

UNITED STATES PATENTS

| Number | Name | Date |
| --- | --- | --- |
| 1,921,879 | Herrman et al. | Aug. 8, 1933 |
| 2,134,102 | Cass | Oct. 25, 1938 |
| 2,410,541 | Joyce | Nov. 5, 1946 |
| 2,467,123 | Fleck et al. | Apr. 12, 1949 |

FOREIGN PATENTS

| Number | Country | Date |
| --- | --- | --- |
| 349,872 | Great Britain | June 4, 1931 |
| 534,733 | Great Britain | Mar. 17, 1941 |